US009294553B1

(12) United States Patent
Vaswani et al.

(10) Patent No.: US 9,294,553 B1
(45) Date of Patent: Mar. 22, 2016

(54) PREDICTIVE RENDERING OF CURRENT CONTENT VERSIONS

(71) Applicant: Amazon Technologies, Inc., Reno, NV (US)

(72) Inventors: Ameet Nirmal Vaswani, Seattle, WA (US); Sajeeva Lakmal Bandara Pallemulle, Woodinville, WA (US); Saral Jain, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 217 days.

(21) Appl. No.: 14/033,022

(22) Filed: Sep. 20, 2013

(51) Int. Cl.
*G06F 15/16* (2006.01)
*H04L 29/08* (2006.01)

(52) U.S. Cl.
CPC ............ *H04L 67/10* (2013.01); *H04L 67/2847* (2013.01)

(58) Field of Classification Search
CPC .................................................. H04L 67/2847
USPC ........................................................ 709/203
See application file for complete search history.

(56) References Cited

U.S. PATENT DOCUMENTS

| 5,991,306 | A | * | 11/1999 | Burns et al. .................. 370/429 |
| 6,108,637 | A | | 8/2000 | Blumenau |
| 6,430,624 | B1 | | 8/2002 | Jamtgaard et al. |
| 6,871,236 | B2 | | 3/2005 | Fishman et al. |
| 7,543,059 | B2 | | 6/2009 | Johnson et al. |
| 8,316,124 | B1 | | 11/2012 | Baumback et al. |
| 2013/0006897 | A1 | * | 1/2013 | Jain et al. ........................ 706/12 |
| 2013/0132509 | A1 | * | 5/2013 | Styles ........................... 709/217 |
| 2014/0025769 | A1 | * | 1/2014 | Shrum et al. .................. 709/213 |
| 2014/0095966 | A1 | * | 4/2014 | Burkard et al. ............... 715/205 |
| 2014/0281016 | A1 | * | 9/2014 | Kennedy et al. ............. 709/234 |
| 2014/0365613 | A1 | * | 12/2014 | Phillips et al. ................ 709/219 |
| 2015/0193547 | A1 | * | 7/2015 | Burkard et al. ............... 709/219 |

* cited by examiner

*Primary Examiner* — Hamza Algibhah
(74) *Attorney, Agent, or Firm* — Knobbe Martens Olson & Bear LLP

(57) ABSTRACT

Features are disclosed for determining which content item or items are likely to be requested by a particular user or device, or by a group of users or devices. The determined content items may be obtained independently of a request from the users or devices, and substantially current versions of the content items may be maintained at a server system, such as an intermediary system. Visual representations of the content items may be generated to reduce processing requirements at a user device. When the content items are determined to be likely to be requested by a particular user, a predicted time may also be determined, and the visual representations may be generated such that they are available at the predicted time.

25 Claims, 5 Drawing Sheets

PREDICTIVE RENDERING OF CURRENT CONTENT VERSIONS

BACKGROUND

Computing devices can be used to request content from other computing devices over a communication network. In a common application, a client computing device can request a web page from a server computing device via the internet. Browser application software on the client computing device typically retrieves the requested web page, processes resource identifiers embedded in the web page to generate requests for additional resources (e.g., images, script files, etc.), and renders the content for presentation. From the perspective of a user of a client computing device, a user experience can be defined in terms of the performance and latencies associated with obtaining and rendering the requested network content on the client computing device. Latencies and performance limitations of any of the above-referenced processes may diminish the user experience.

Proxy servers and content delivery networks can reduce requests to an origin content server by providing cached copies of content to computing devices. In addition, proxies and content delivery networks and help reduce page load times by storing the cached content closer to a computing device. For example, computing devices can transmit content requests to a proxy server rather than directly to an origin server. The proxy server can obtain content from origin servers on behalf of the computing devices, provide the content to the computing devices, and also store copies of the content in a cache. The proxy server can then service subsequent requests for content from its own cache, rather than obtaining the content from the origin server, if the requested content exists in the cache and has not yet expired. Some proxy servers use "cache warmers" or other components to update cached content and reduce the likelihood that cached content will expire before a subsequent request for the cached content is received by the proxy server.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
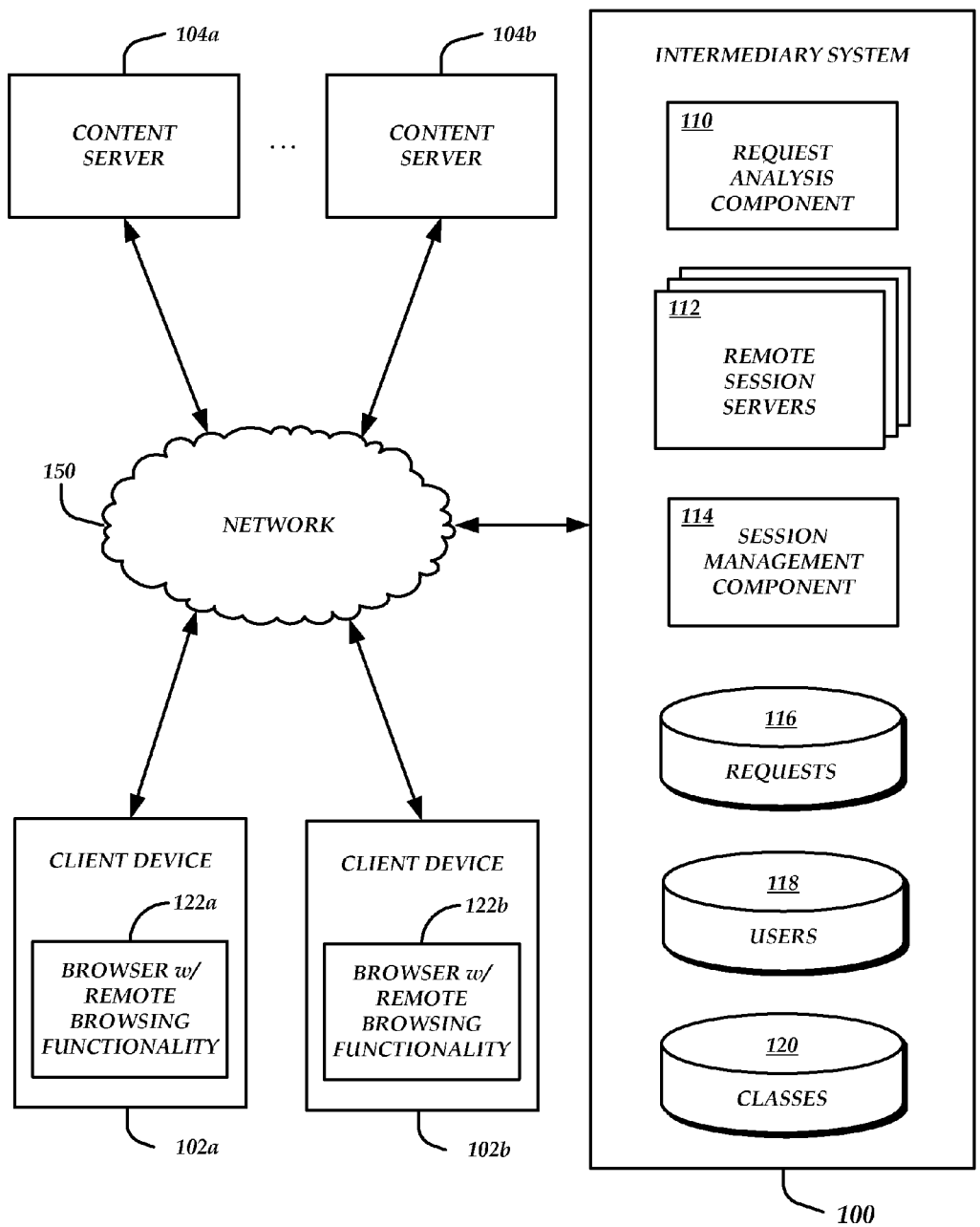
FIG. 1 is a block diagram of an illustrative content delivery environment including a multiple client devices, multiple content servers, and an intermediary system.

The present disclosure is directed to maintaining up-to-date, pre-processed versions or instances of network content items that are likely to be requested, and also providing efficient access to those versions or instances in response to user requests. The network content items may correspond to web pages, images, animations, documents, and other forms of electronic content accessible via a network, such as the internet. An intermediary system that operates as an intermediary between user computing devices and content servers may maintain a substantially current version or representation of a network content item, such as a fully or partially rendered view of the content item. The view may be accessible via a remote desktop connection, a video feed, a screenshot, or the like. When a user makes a request for the network content item, the user's computing device can access the view or otherwise be provided with a representation of the current version by the intermediary system. The amount of time required for the user device to load and display this view may be significantly less than the amount of time that would be needed to load and display the corresponding content from the origin server. In this way, the user-perceived latency between transmitting a request for content and viewing the requested content can be reduced.

Some conventional intermediary systems or third party systems, such as proxy servers or content delivery networks ("CDNs"), may maintain current versions of network content. However, a user computing device requesting such content typically must still retrieve and render the content at the user computing device. Although the presence of the content at the proxy server or CDN can reduce latency attributable to network communication with an origin server, the amount of processing performed by the user computing device may be substantially the same as when the content is retrieved from the origin server. In some cases, the processing latency may be significant, such as when executable code is embedded into a content page, when a content page includes complex formatting, etc. Systems that maintain up-to-date, pre-processed versions of content pages, such as the intermediary systems described in greater detail below, can provide views of the content pages that may be displayed with less user-perceived latency.

Some aspects of the present disclosure relate to predicting or otherwise determining which content items a user or class of users is likely to request. For example, an intermediary system that receives content requests from users and retrieves requested content on behalf of those users may have access to historical request data from any number of users or user computing devices. The intermediary system, or a separate computing system, may perform an aggregated analysis or data mining of the historical request data to determine which content a particular user typically requests, identify content items requested by clusters of users, etc. The content items that a user or group of users are most likely to request may be proactively retrieved by the intermediary system (without receiving a request from a user computing device) so that the content items may be available to service subsequent requests for the content. In addition, the proactively retrieved content items may be rendered or otherwise processed to reduce the amount of processing that a user computing device will need to perform to display the content. For example, a content item may be rendered by a browser application or other rendering engine executing at the intermediary system. Such rendering may take various factors into consideration to improve or optimize transmission to, and viewing by, devices with particular characteristics (e.g., screen size and resolution, form factor, processor capabilities, network availability, etc.). A content item may be kept substantially current by, e.g., polling an origin server, using cache expiration times, etc. Users may access a remote desktop connection view of the rendered content page, a video of the rendered content page, etc. Establishment of such connections may be performed more quickly than transmission of content files to a user computing device and subsequent processing of the content files by the user computing device.

Additional aspects of the disclosure relate to different methods of pre-rendering and other processing that may be applied to the versions of content maintained by the intermediary system. As described above, the intermediary system may render a content item in a server-based rendering engine, and then provide remote desktop views, video feeds, and other representations of the rendered content. By providing such pre-rendered or otherwise pre-processed views of content to a client device, the time to first paint at the client device may be reduced, thereby improving user-perceived performance. In some embodiments, a content page may be rendered or otherwise processed by the intermediary system, and a file or other data object containing the rendered or processed version of the content (e.g., a representation of the memory space associated with the content page, the contents of a frame buffer, etc.) may be transmitted to the client device where it can be displayed and interacted with locally (as opposed to a remote desktop connection to a browser executing at a server). In some embodiments, a screenshot may be generated by the intermediary system and transmitted to the user computing device. The screenshot may be generated based on a rendering of the content in a server-based rendering engine, or it may be generated via some other process.

Further aspects of the disclosure relate to using a combination of these and/or other methods to process content based on, e.g., the relative likelihood that a given content item may be requested and the resources required to process and maintain the versions. In some embodiments, the processing methods that require the most computing resources at the intermediary system, and which provide the greatest user-perceived performance gain, may be reserved for those content items that are most likely to be requested. Pages that are less likely to be requested may still be pre-processed at the intermediary system. However, such pages may be processed using techniques that require fewer computing resources or less processing time at the intermediary system, while still providing improved user-perceived performance at a client device. For example, a browser may be configured to request the same page or pages (known as "home pages") each time the browser is initialized. The intermediary system may fully render a current version of such a home page prior to a time that a user is predicted to initiate a browsing session. Upon user-initiation of a browsing session, the user may be quickly presented with a remote desktop view of the fully rendered current version of the home page at the intermediary system. As another example, a user may be somewhat less likely to request a different content page (e.g., a sports content page). A substantially current version of the sports content page may also be obtained prior to the time that the user is predicted to initiate the browsing session. However, less rendering or processing may be performed on the sports content page due the lowered likelihood that it will be requested. If a user does request the sports content page, the user may still have a better user experience than a typical request to the origin server or a retrieval from a network-based cache because the content page has been at least partially rendered or otherwise processed by the intermediary system.

Although aspects of the embodiments described in the disclosure will focus, for the purpose of illustration, on fully or partially rendering content pages at an intermediary system for presentation at a user device, one skilled in the art will appreciate that the techniques disclosed herein may be applied to any number of services, process, or applications. For example, content pages may be processed in other ways, such as parsing out or selecting only an important or popular portion of the page to maintain, applying compression, and the like. Various aspects of the disclosure will now be described with regard to certain examples and embodiments, which are intended to illustrate but not limit the disclosure.

Networked Content Delivery Environment

FIG. 1 illustrates an example content delivery environment in which features can be implemented for maintaining current versions of content and providing efficient access to those versions. The content delivery environment can include an intermediary system 100, multiple client devices 102a and 102b, and multiple content servers 104a and 104b. The various systems may communicate with each other via a communication network 150. The network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or combination thereof, each with access to and/or from the Internet.

The intermediary system 100 can be a computing system configured to receive content requests from client devices 102a and 102b, retrieve requested content from content servers 104a and 104b on behalf of the requesting devices, and provide the requested content to the requesting devices. For example, the intermediary system 100 can be a server or group of servers that may be accessed via the network 150. In some embodiments, the intermediary system 100 may be an intelligent proxy server, a system operated by an internet service provider (ISP), or some other device or group of devices that retrieve content on behalf of client devices 102.

The intermediary system 100 can include various components to provide the features described herein, such as a request analysis component 110 to analyze request data, one or more remote session servers 112 to maintain current versions of content, and a session management component 114 to assign sessions to particular remote session servers and otherwise coordinate sessions. In some embodiments, the request analysis component 110 can analyze request data and identify groups of users that request the same pages, groups of pages that are typically requested in the same browsing session, group of pages likely to be requested by a specific user, etc. The remote session servers 112 may include browser applications or other content rendering engines to fully or partially render content at the intermediary system 100. The remote session servers 112 may correspond to virtual machines or physical machines that can process and respond to content requests from one or more users. The session management component 114 may manage which remote session servers 112 are to maintain versions of particular content items, and then match new browsing sessions, initiated by client devices 102, to a remote session server 112 that is maintaining up-to-date versions of content likely to be requested in the particular browsing session.

The intermediary system 100 may also include a number of data stores. For example, the intermediary system 100 may include a requests data store 116 that stores data about content requests received from client devices 102, a users data store 118 to store data about particular users of the client devices 102 (e.g., demographic information, content request prediction information, etc.), and a classes data store 120 that stores data classes or other groups of users (e.g., members of the various groups, content request prediction information, etc.).

The intermediary system 100 may include multiple computing devices, such as computer servers, logically or physically grouped together. The components of the intermediary system 100 can each be implemented as hardware, such as a server computing device, or as a combination of hardware and software. In addition, the components of the intermediary system 100 can be combined on one server computing device or separated individually or into groups on several server computing devices. In some embodiments, the intermediary system 100 may include additional or fewer components than illustrated in FIG. 1. For example, a single component may perform the functions of both the request analysis component 110 and the session management component 114. As another example, the performance analysis system 100 may include or otherwise be associated with various additional computing resources, such as content servers 104, content delivery network (CDN) systems, internet service providers (ISPs), and the like.

In some embodiments, the features and services provided by the intermediary system 100 may be implemented as web services consumable via the communication network 150. In further embodiments, the intermediary system 100 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment The client devices 102a and 102b can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. The client devices 102a and 102b may be configured with browser applications 122a and 122b, respectively, to communicate via the network 150 with other computing systems, such the intermediary system 100 or content servers 104a and 104b, and to request, receive, process, and display content.

The browser applications 122a and 122b may provide remote browsing functionality. As used herein, the terms "remote browsing" and "remote session" refer to scenarios in which a client device 102 accesses and displays content processed remotely, such as at a remote session server 112. For example, the content may be partially or completely rendered at a remote session server 114, and a browser application 112a on a client device 102a may access and display that rendered content rather than retrieving the content files (e.g., HTML files, images files, etc.) and rendering them locally at the client device 102a.

In some embodiments, a browser application 122a may be configured to establish connections to a server-side browser (e.g., at a remote session server 112) using a remote session communication protocol, such as Remote Desktop Protocol (RDP), X-Windows protocol, Virtual Network Computing (VNC) protocol, Remote Frame Buffer protocol, etc. For example, RDP specifies a number of processing mechanisms for encoding client input (e.g., mouse movement, keyboard input, etc.) into protocol data units for provision to a remote computing device, such as a remote session server 112, and corresponding mechanisms for sending bitmap updates and low level interface information back to the client device 102a. One example of such a system is disclosed in U.S. patent application Ser. No. 13/174,615, filed on Jun. 30, 2011 and incorporated by reference herein for all that it discloses.

In some embodiments, a browser application 122a may be configured to receive screenshots or image representations of rendered content from a server. The browser application 122a may present the screen shot while receiving the content item in a parallel or background process for rendering locally on the client device 102a. When the content items has been rendered and is ready for presentation to the user, the screenshot displayed by the browser 122a may be replaced by the locally rendered content. One example of such a system is disclosed in U.S. patent application Ser. No. 13/901,446, filed on May 23, 2013 and incorporated by reference herein for all that it discloses.

The processing of content by a remote session server 112 in the routines described in detail below is not limited to the illustrative remote rendering methods described above. Rather, a remote session server 112 may implement any pre-rendering or other pre-processing of content that reduces user-perceived latency and improves the user experience.

In operation, one or more client computing devices 102a, 102b may be associated with an intermediary system 100. For example, a user may have an account with the intermediary system 100, or the browsers 122a and 122b or client devices 102a and 102b may be configured to route some or all content requests through the intermediary system 100 rather than sending all content requests to content servers 104a, 104b associated with the desired content.

The content servers 104a, 104b can correspond to logical associations of one or more computing devices for hosting content and servicing requests for the hosted content over the network 150. For example, a content server 104a can include a web server component corresponding to one or more server computing devices for obtaining and processing requests for content (such as content pages) from client devices 102a and 102b, the performance analysis system 100, or other devices or service providers. In some embodiments, one or more content servers 104a, 104b may be associated with a CDN service provider, an application service provider, etc.

Figure 2:
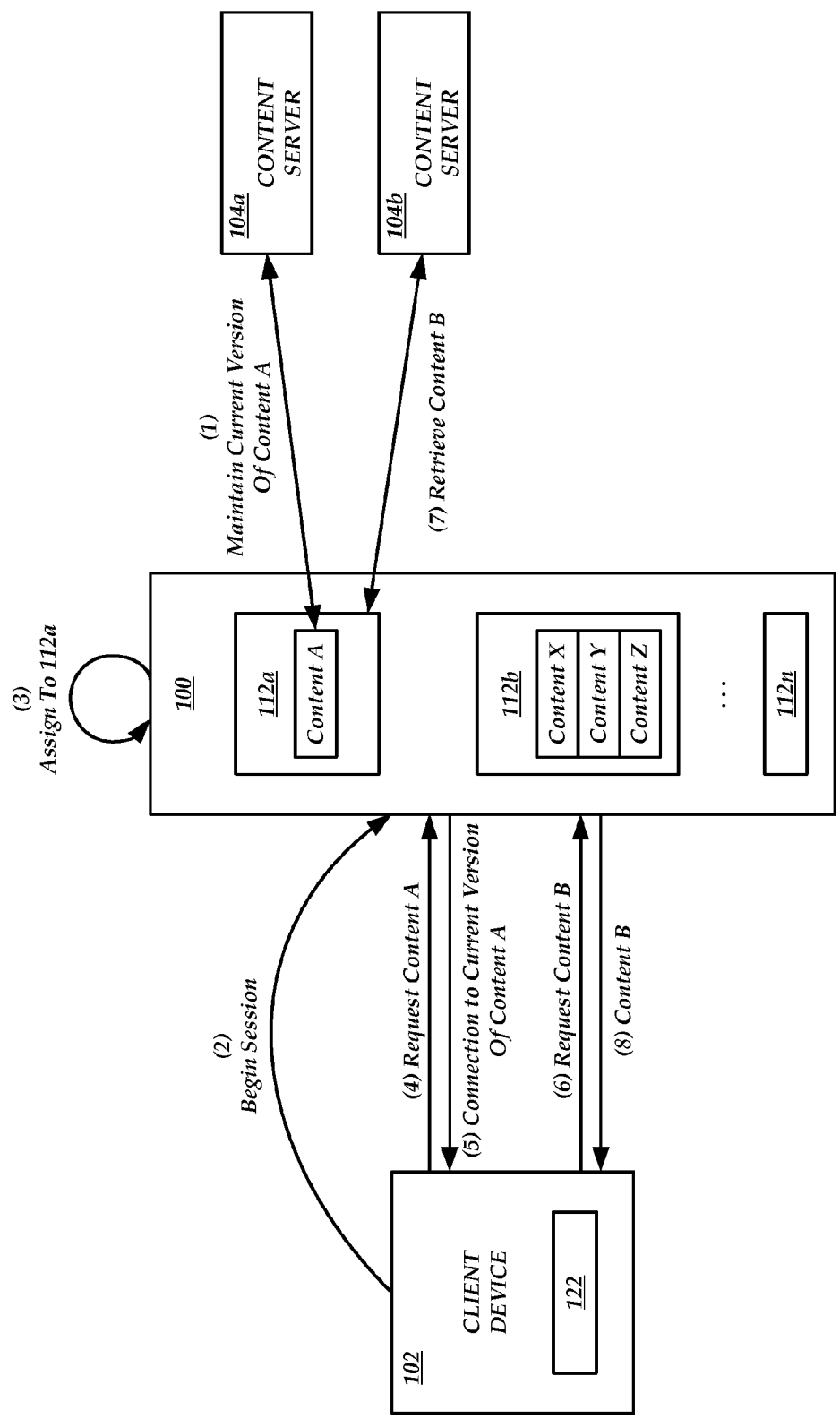
FIG. 2 is a block diagram of illustrative communications and data flows between a client device, an intermediary system, and multiple content servers.

FIG. 2 illustrates example data flows and interactions between a client device 102, an intermediary system 100, and multiple content servers 104a and 104b. The intermediary system 100 may have access to information about prior content requests from the user or client device 102, such as data in the requests data store 116. The intermediary system 100 may predict or otherwise determine which content page or pages the user is most likely to request, at which time the user is likely to request the page or pages, etc. Illustratively, the intermediary system 100 may determine that the user of the client device 102 is likely to request content A during a window of time. Prior to that window, a remote session server 112a may initialize a server-based browser application and obtain a current version or instance of content A from content server 104a at (1). The remote session server 112a can maintain a substantially update-to-date version of content A by, e.g., periodically polling content server 104a for updates, utilizing cache control headers of the resources associated with content A (e.g., cache expirations for individual HTML files or images), and the like.

The remote session server 112a may fully or partially render predictively retrieved content, or otherwise generate some visual representation of the content in order to reduce the time to first paint on the client device. For example, the remote session server 112a may fully render the content in a server-based browser application or rendering engine. Client devices 102 subsequently requesting the content may access a video feed or image of the fully rendered content. As another example, the remote session server 112 may fully or partially construct the document object model ("DOM") or render tree for the content. Subsequent requests from client devices 102 for the content item may be fulfilled with the pre-generated DOM or render tree rather than the individual content objects.

The intermediary system 100 may include any number of additional remote session servers 112b-112n, as shown. Some remote session servers, such a remote session server 112b, may maintain current versions of various content items which may be different than the versions of content maintained by the remote session server 112a described above. For example, remote session server 112b may be maintaining current versions of content X, content Y, and content Z for a different user, for a class of users, etc. Illustratively, remote session servers that are configured to maintain current versions of content items for a group of users may maintain such versions indefinitely or otherwise for longer periods of time than the predicted time window associated with the user in the current example described above. In some embodiments, one or more remote session servers may be configured to maintain current versions of some number of content items most likely to be requested by any random user of the intermediary system, such as a first time or infrequent user. In some embodiments, multiple remote session servers 112a, 112b may be configured to maintain versions of content for a single user or a single group of users, and requests for particular content items may be routed to the remote session server 112a or 112b that is currently maintaining an version of the requested content.

Returning to the example described above, a user of the client device 102 may initiate a browsing session. The browser 122 may establish a connection with, or transmit a notification to, the intermediary system 100 at (2). The intermediary system 100 can identify the user of the client device 102 (e.g., through some identifier included with the request) and assign the user's browsing session to remote session server 112a at (3). In some embodiments, no notification or connection to the intermediary system 100 is made automatically upon initialization of a browsing session. Rather, the first communication to the intermediary system 100 in a browsing session may occur when the user transmits a request for content.

A user of the client device 102 may use the browser 122 to initiate a request for content A at (4). The request may be transmitted to the intermediary system 100 rather than directly to the content server 104a in order to take advantage of the predictive pre-processing provided by the intermediary system 100. In some embodiments, the request may be provided directly to the remote session server 112a. As described above, the remote session server 112a may be maintaining a current, pre-rendered version of content A, e.g., in a server-based browser or other rendering engine. The client device 102 may be provided with a connection to the current version of content A at (5). Illustratively, the connection may be a remote desktop connection, a video feed, or some other view of content A rendered at the remote session server 112a. In some embodiments, different portions (e.g., regions) of a content item, or different objects associated with the content item (e.g., embedded resources, such as images) may be transmitted using different protocols. For example, a remote session communication protocol such as RDP may be used to provide a view of one or more graphical portions of a content page, while a different protocol, such as Hypertext Transfer Protocol ("HTTP"), may be used to transmit textual or other no-graphical portions or elements of a content page. The particular protocol used for transmitting a given content element or portion of a content page may be chosen based on the type of content for which the protocol is optimized or best-suited to be used.

The user of the client device 102 may use the browser 122 to initiate a request for a different content page—content B—at (6). As shown in FIG. 2, remote session server 112a may not have a current version of content B available to provide to the client device 102. For example, the user may not have been predicted to request content B, or the remote session server 112a may only be configured to maintain a certain number of most likely content items, and content B may not be one of those content items most likely to be requested. The remote session server 112a may attempt to obtain content B or some portion thereof from a cache, or it may retrieve content B from the corresponding content server 104b, as shown. The remote session server 112a may provide content B to the client device 102 at (8).

The remote session server 112a or some other component of the intermediary system 100 may store data regarding the requests by the user (e.g., in the requests data store 116) for use in predicting future requests by the user. In some embodiments, the remote session server 112a may predictively retrieve and pre-render content based on requests in the current browsing session. For example, if content C is typically requested in the same browsing session as content B, the remote session server 112a may obtain and render content C so that the user may be quickly provided with a rendered view of content C in response to a subsequent request for content C.

Process for Remote Session Configuration

Figure 3:
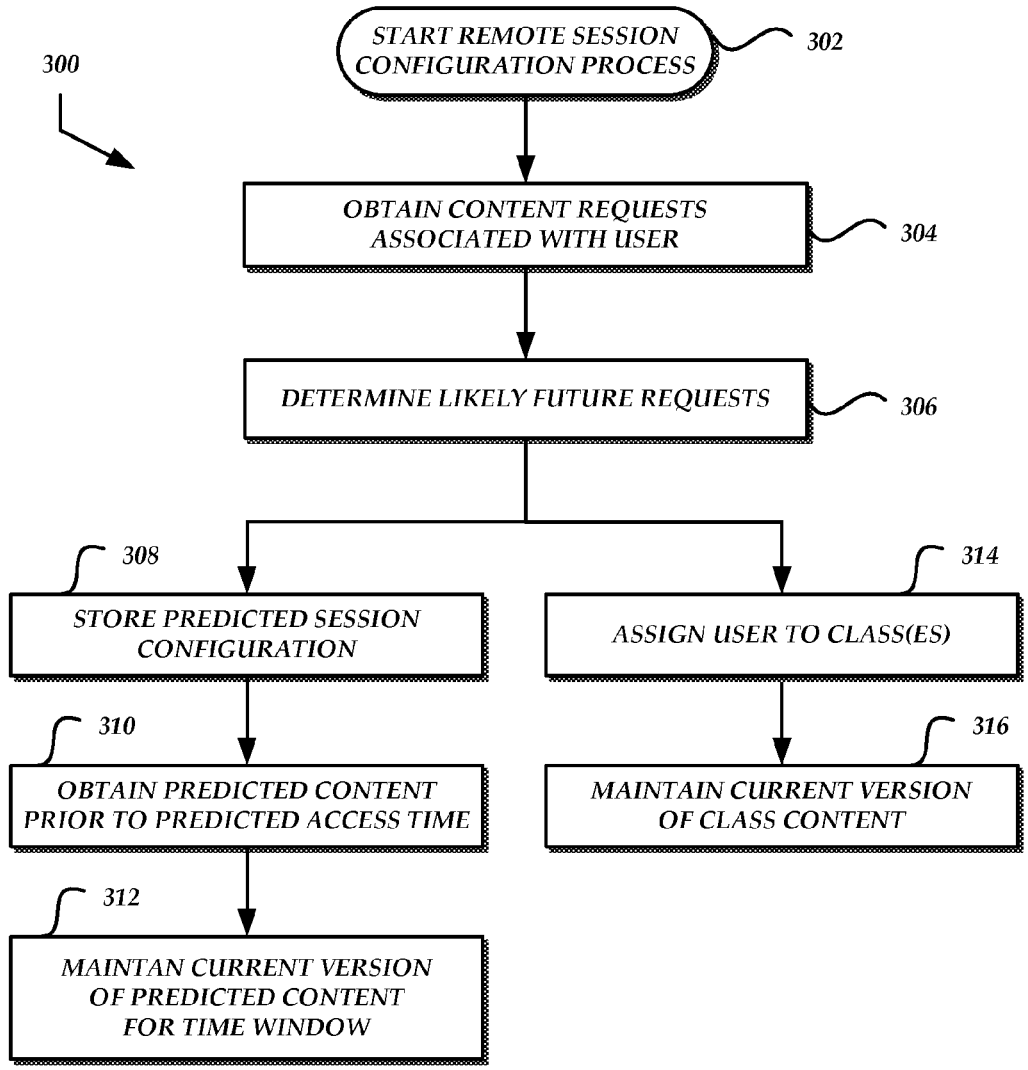
FIG. 3 is a flow diagram of an illustrative process for initiating and maintaining remote browse sessions so that current versions of content can be accessed by users.

FIG. 3 illustrates a sample process 300 for identifying content items to maintain in remote sessions managed by the intermediary system 100. Advantageously, a request analysis component 110 or some other component of the intermediary system 100 can analyze request data from any number of distinct users or client devices to identify request timing patterns, clusters of content items that tend to be requested in the same browsing sessions, and the like. A remote session management component 114 or some other component of the intermediary system 100 may use the results of the analysis to launch and manage remote browsing sessions that maintain current versions of content items most likely to be requested.

The process 300 begins at block 302. At block 304, the request analysis component 110 can obtain content requests associated with a particular user. The requests may be retrieved from a requests data store 116, a users data store 118, a client device 102, or some other source.

At block 306, the request analysis component 110 can determine which content items are likely to be requested by the user in the future. The likely future requests may be associated with likely future request times. For example, a user may be likely to request a particular news content page at a particular time or during some window of time in the morning, but the same user may be unlikely to access that page later in the day. Rather, the user may be more likely to request a work-related content page later in the day. In this way, the request analysis component 110 may make predictions about which content a user is likely to request and when the user is likely to request it, and these predictions can be used to initiate remote session and maintain current versions of content for the user. Additional factors may also be considered when determining which content items are likely to be requested. For example, characteristics of the client device or devices used by the user to make requests may be considered (e.g., processor capabilities, form factor, screen size, resolution, etc.). A user may be likely to request a particular content page with a particular type of device, and the same user may be more likely to request a different content page when using a different type of device at a different time.

At block 308, predicted session configuration data may be stored for the user based on the determinations described above. For example, data regarding the content pages that the user is likely to request, and the particular window of time in which those requests are likely to be made, may be stored (e.g., in the users data store 118). In some embodiments, the user may have multiple windows of likely browsing activity, and each window may include the same content pages or different content pages. Predicted session configuration data may be stored separately for these separate windows. In some embodiments, data regarding the device that the user is likely to use to make particular requests may also be stored.

At block 310, the session management component 114 may determine that a predicted window of browsing activity is approaching. The session management component 114 may provide predicted session configuration data to a remote session server 112, and the remote session server 112 may retrieve and process the predicted content prior to the beginning of the predicted window of browsing activity. At block 312, the remote session server 112 may maintain current versions of predicted content for the duration of the predicted widow and, in some cases, for a buffer period of time before and/or after the predicted window. In some embodiments, the remote session server 112 may maintain current versions directed to particular device characteristics, such as those characteristics associated with the device likely to be used by the requesting user. For example, content may be rendered such that it is viewed best on a small mobile device if the user is likely to request the content on a mobile device.

In addition to the user-specific predictions described above, or as an alternative, the request analysis component 110 or some other component of the intermediary system 100 may assign a user to one or more classes or groups of users at block 314. Groups of users may be defined in terms of similar predicted content requests. For example, if the browsing sessions of a distinct group of users typically include requests for one or more of the same content items, those users may be assigned to a group browsing session. If the present user is determined to be likely to request one or more of the same content items as an existing group, then the user may be assigned or associated with the group. In some embodiments, device characteristics may also be used to assign users to particular groups (e.g., some groups may include only users who request particular content on small mobile devices, while other groups may include only users request that same content, but on larger and more powerful desktop computers). In some embodiments, rather than assigning users to previously determined groups, a request analysis component 110 may analyze aggregated request data from multiple users and identify a cluster of users that tend to request the same or similar content items.

At block 316, the remote session management component 114 may provide group browsing session configuration data to a remote session server 112. The remote session server 112 can maintain current, pre-processed versions of one or more content items that are predicted to be requested by members of the group. As described in greater detail below, when a user assigned to or otherwise associated with the group initiates a browsing session, that user may be assigned to the remote session server 112 for the group. As a result, requests for content predicted to be requested by users in the group may be serviced with the current versions of content maintained by the remote browse session server 112.

Process for Managing Remote Sessions

Figure 4:
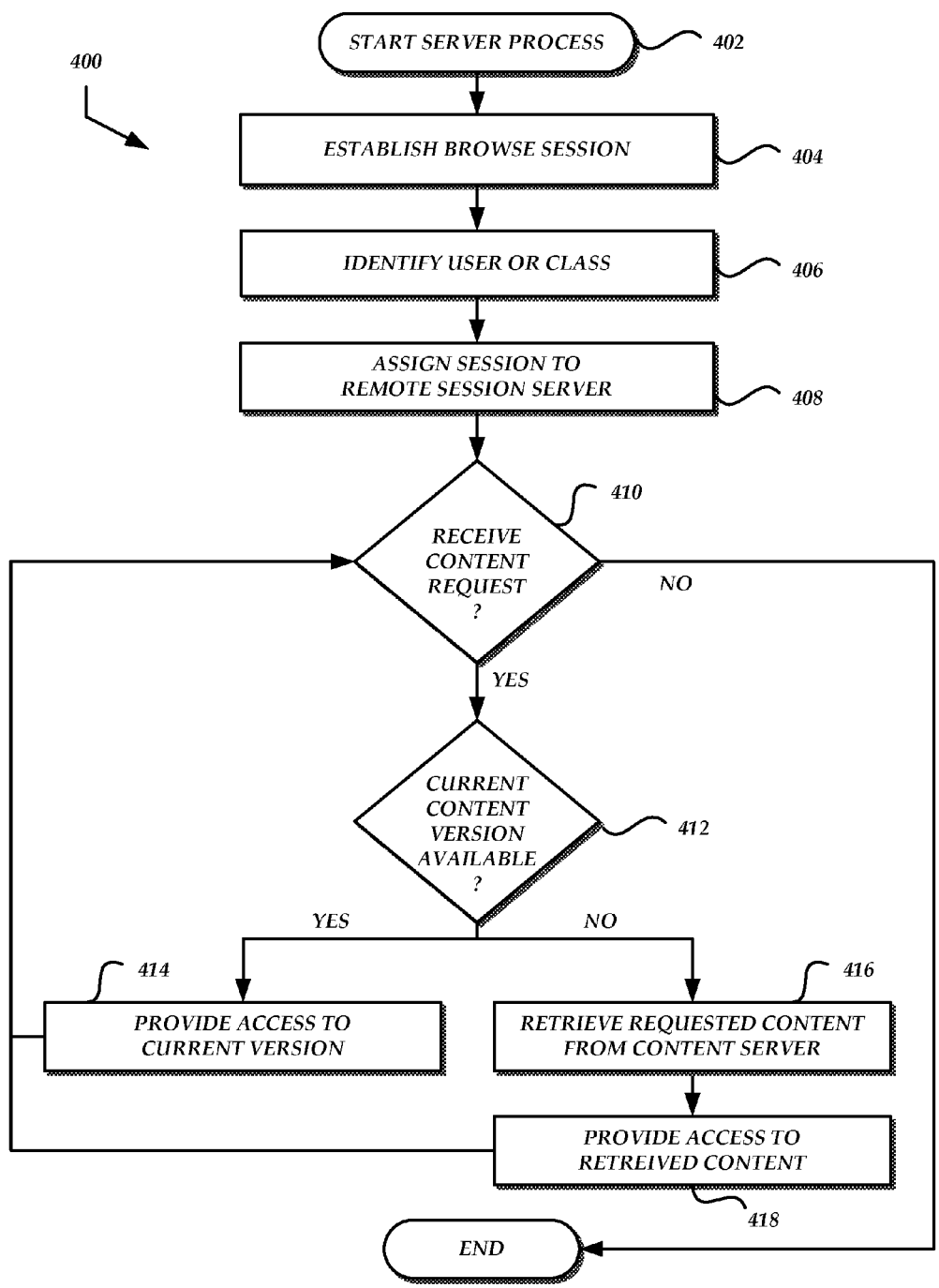
FIG. 4 is a flow diagram of an illustrative process for assigning a browse session to a remote browse session server and responding to content requests associated with the browse session.

FIG. 4 illustrates a sample process 400 for managing assignment of users to remote sessions, and servicing requests received by the intermediary system 100 from users associated with a remote session.

The process 400 begins at block 402. At block 404, a new browsing session may be established with the intermediary system 100 by a client device 102. At block 406, the intermediary system 100 may identify the user (or computing device) associated with the newly established browsing session. For example, data included in a request for a new browsing session may be used to identify the user (e.g., a user identifier, a client device identifier, an IP address, a MAC address, etc.).

At block 408, the remote session management component 114 may assign the user's session to a particular remote session server 112. For example, if a remote session server 112 is currently maintaining versions of predicted content for the user, then the browsing session may be assigned to that server 112. If the user is associated with a group, and a remote session server 112 is currently maintaining versions of content likely to be requested by members of the group, then the browsing session may be assigned to that server. In some embodiments, a browsing session may be assigned to multiple servers.

At decision block 410, a remote session server 112 can determine whether a content request has been received from the computing device 102. If so, the process 400 may proceed to decision block 412. If no content request is received form a user (e.g., the browsing session times out due to lack of browsing activity), the process 400 may terminate.

At decision block 412, the remote session server 112 can determine whether a current version of the requested content is available at the remote browse session server 112. If so, the process 400 may proceed to block 414, where the client device 102 is provided with access to the current version of the content item. For example, as described above, a remote desktop connection or video feed of the rendered content may be provided to the client device 102, a processed representation of the content may be provided to the client device 102, a screen shot may be provided to the client device 102, etc. In some embodiments, a substantially current copy of the content item may be provided to the client device 102 subsequent to, or in parallel with, providing access to the current version of the content item at the remote browse session server 112. For example, HTML files, images files, and the like may be transmitted in unprocessed or substantially unprocessed form to the client device 102 while the client device 102 is displaying a view of the content item rendered at the remote browse session server 112. The client device 102 may process and render the copy of the content item locally, and then replace the view of the content item rendered at the remote browse session server 112 with the version rendered locally at the client device 102.

If no current version of the content is available at the remote session server 112 (e.g., the user has requested a content item that the request analysis component 110 did not determine the user was likely to request), the process 400 may proceed to block 416, where the remote session server 112 may retrieve the requested content from a content server 104 hosting the requested content. Once obtained, the content may be provided to the client device at block 418. The process 400 may then return to block 410.

Process for Interacting with an Intermediary System

Figure 5:
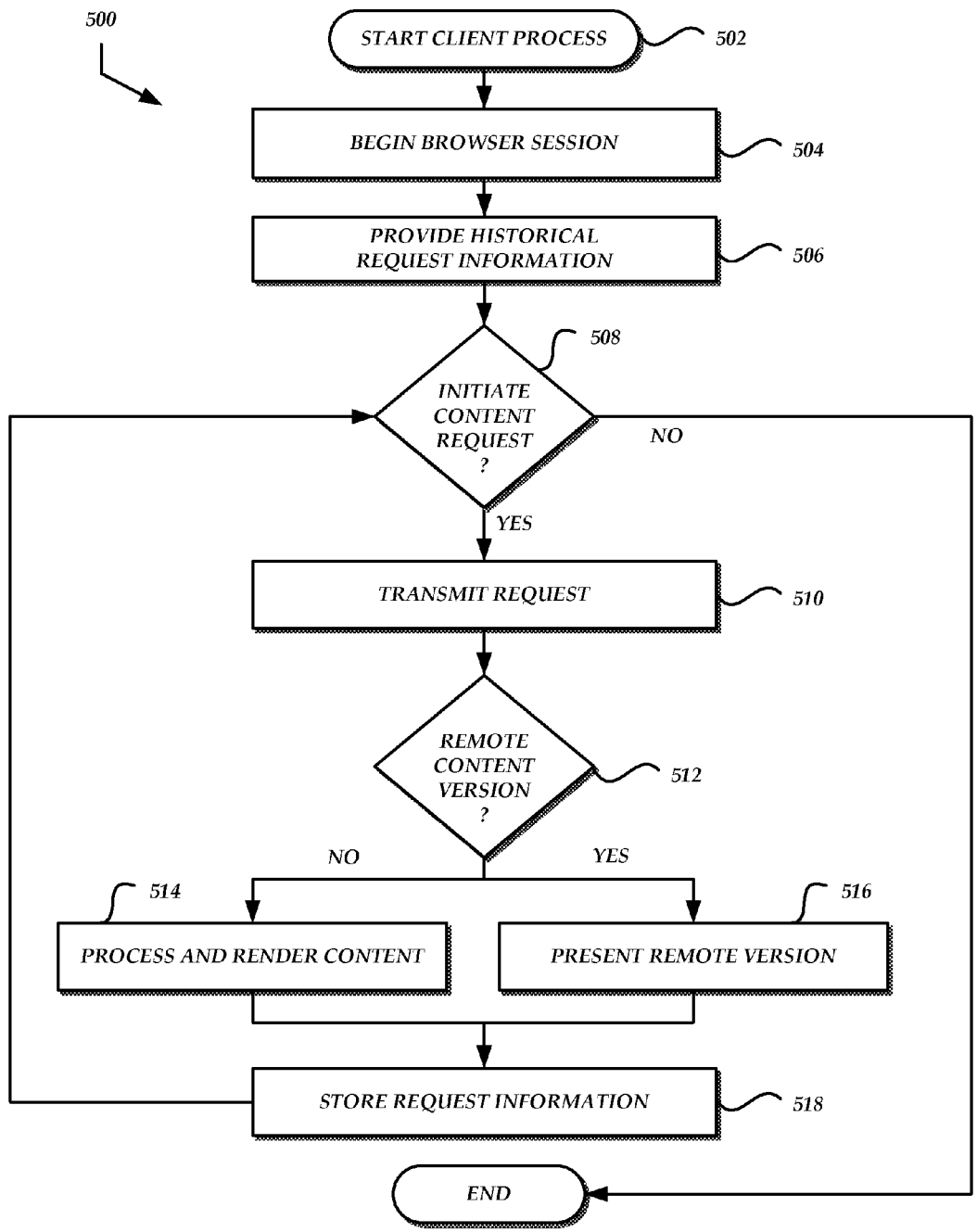
FIG. 5 is a flow diagram of an illustrative process for establishing and conducting a browsing session with an intermediary system.

FIG. 5 illustrates a sample process 500 that can be performed by a browser application 122, browser add-in, toolbar, or some other component of a client device 102. The process 500 may be used to establish a browsing session with an intermediary system 100 and present content processed by the intermediary system 100.

The process 500 begins at block 502. At block 504, a new browsing session may be established at the client device 102. For example, a user may launch a browser application 122 or initiate a request for content.

At block 506, information regarding prior or predicted further requests by the client device 102 may be provided to the intermediary system 100. For example, the browser application 122 or some other component of the client device 102 may maintain historical request information locally. By maintaining such information locally, a user may more directly maintain privacy and security regarding browsing behaviors than would be the case for historical request information stored at the intermediary system 100. Historical request information that is provided to the intermediary system 100 may be data regarding individual requests, or may be aggregated or summarized data. An intermediary system 100 may analyze such data to, e.g., assign the user's browsing session to a particular remote session server 112, or to pro-actively retrieve and render content likely to be requested by the server. In some embodiments, rather than providing historical request information, the browser application 122 or some other component of the client device 102 may determine which content items are most likely to be requested during the current browsing session, and transmit content request prediction data to the intermediary system 100.

At decision block 508, the browser 122 or some other component of the client device 102 can determine whether a content request has been initiated. If so, the process can proceed to block 510, where the request is transmitted to the intermediary system 100. Otherwise, if no content request is initiated (e.g., the browser session times out due to lack of activity), the process 500 may terminate.

At decision block 512, the browser 122 or some other component of the client device 102 can determine whether the response from the intermediary system 100 relates to a view of a remotely rendered or processed version of the requested content, or the response includes the requested content file(s). If the response includes the requested content file(s), the process 500 may proceed to block 514, where the browser 122 can process and render the content files. Otherwise, if the response relates to a remotely processed version of the requested content, the process 500 can proceed to block 516.

At block 516, the browser 122 or some other component of the client device 102 can take the necessary steps to present the remote version of the content to the user. For example, the browser 122 can establish an RDP connection or a connection according to some other remote session communication protocols. The browser may then present a view of the content rendered at the remote browse session server 112. As another example, the browser may receive an image of the content rendered by the remote browse session server 112, and can present that image on the client device. As described above, the browser 122 may subsequently, or in parallel, receive an unprocessed or substantially unprocessed copy of the content item from the intermediary system 100 or directly from the content server 104. The browser 122 can process and render the content, and then replace the view of the content processed by the intermediary system with the locally rendered content item.

At block 518, the browser 122 or some other component of the client device 102 can store information about the request (e.g., the network address or some other identifier of the item requested, the time at which the request was initiated, the current user of the client device 102, etc.). The process 500 may then return to block 508. In some embodiments, information about the request may be stored at a different point in the process 500, such as before block 510, before block 512, in parallel with one of the blocks described above, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the processes described with respect to FIGS. 3, 4 and 5 may be embodied in a set of executable program instructions stored on a computer-readable medium, such as one or more disk drives, of the client device or a computing system with which the performance analysis system is associated. When a process is initiated, the executable program instructions can be loaded into memory, such as RAM, and executed by one or more processors of the client device or computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising one or more server computing devices programmed to at least:
   determine, based at least on prior request data associated with a user, a content item likely to be requested by the user and a time at which the user is likely to request the content item;
   responsive to a determination that a current time is within a selected range of the determined time, determine a server-based rendering engine of a plurality of server-based rendering engines, separate from a user computing device of the user, that is rendering the content item; and
   responsive to a subsequent request for the content item from a user computing device operated by the user, establish a remote connection between the server-based rendering engine and the user computing device, such that the user computing device may access the rendered content item,
   the system thereby reducing a user-perceived load time for the content item relative to a load time for loading the content item from the content server.

2. The system of claim 1, wherein the one or more server computing devices are further programmed to maintain a substantially current rendered version of the content item in the server-based rendering engine for a period of time, the period of time including the determined time.

3. The system of claim 2, wherein the one or more server computing devices are further programmed to maintain the substantially current rendered version of the content item by periodically polling the content server.

4. The system of claim 1, wherein the remote connection is established using a remote session communication protocol.

5. The system of claim 1, wherein one or more server computing devices are further programmed to provide a visual representation of the rendered content item to the user computing device via the remote connection.

6. The system of claim 1, wherein the one or more server computing devices are further programmed to transmit a substantially current copy of the content item to the user computing device subsequent to the user computing device accessing the rendered content item at the one or more server computing devices.

7. The system of claim 1, wherein the one or more server computing devices are further programmed to:
   receive, from the user computing device, a plurality of requests for content items; and
   store prior request data reflecting at least a portion of the plurality of requests, the prior request data associated with the user.

8. A computer-implemented method comprising, as executed by one or more server computing devices:
   identifying, based at least on content request data reflecting content requests from a subset of a plurality of user computing devices, a content item likely to be requested by a user computing device of the subset;
   in response to identifying the content item, maintaining, by a server-based rendering engine of a plurality of server-based rendering engines assigned to the subset, a substantially current version of the content item without receiving a request for the content item, the substantially current version comprising a processed visual representation of the content item; and
   in response to a request for the content item from a first user computing device of the subset, providing the first user computing device with access to the substantially current version of the content item.

9. The computer-implemented method of claim 8, further comprising:
   receiving a plurality of content requests from the plurality of user computing devices, the plurality of requests corresponding to content items hosted by content servers separate from the one or more server computing devices; and
   storing content request data reflecting at least a portion of the plurality of requests.

10. The computer-implemented method of claim 8, wherein the content item comprises at least one of a web page, an image, a video, or a document.

11. The computer-implemented method of claim 8, wherein providing the first user computing device with access to the substantially current version comprises establishing a connection with the first user computing device using a remote session communication protocol.

12. The computer-implemented method of claim 8, wherein providing the first user computing device with access to the substantially current version comprises providing a video feed of the content item as rendered by the server-based rendering engine.

13. The computer-implemented method of claim 8, wherein providing the first user computing device with access to the substantially current version comprises transmitting an image of the substantially current version.

14. The computer-implemented method of claim 8, further comprising transmitting a substantially current copy of the content item to the first user computing device subsequent to the first user computing device accessing the rendered content item at the one or more server computing devices.

15. The computer-implemented method of claim 8, further comprising:
   maintaining a second substantially current version of a second content item, the second substantially current version associated with a second subset of the plurality of user computing devices.

16. The computer-implemented method of claim 15, further comprising assigning a user of the first computing device to the subset based at least on previous content requests initiated by the user.

17. The computer-implemented method of claim 15, further comprising assigning a user of the first computing device to the subset based at least on a characteristic of the first user computing device.

18. The computer-implemented method of claim 8, wherein the content request data is received from the first user computing device in conjunction with a request for a content item.

19. The computer-implemented method of claim 8, wherein the content request data is received from the first user computing device independently of any request for a content item.

20. The computer-implemented method of claim 8, wherein providing the first user computing device with access to the substantially current version of the content item comprises transmitting a plurality of content objects associated with the content item using at least two different communication protocols.

21. A non-transitory computer storage medium comprising a browser module configured to execute a process on a user computing device, the process comprising:
    determining, based on prior content requests initiated by the user computing device, a first content item likely to be requested by the user computing device;
    transmitting, to a server computing device, content request data regarding one or more content items likely to be requested by the user computing device;
    transmitting, to the server computing device, a request for the first content item; and
    in response to the request, accessing a visual representation of the content item rendered by a server-based rendering engine of a plurality of server-based rendering engines that is determined by the server computing device to be rendering the content item.

22. The non-transitory computer storage medium of claim 21, wherein the browser module comprises one of: an application, a browser toolbar, or a browser add-in.

23. The non-transitory computer storage medium of claim 21, wherein accessing the visual representation comprises establishing a connection using a remote session communication protocol.

24. The non-transitory computer storage medium of claim 21, wherein the process further comprises receiving, in response to the request, a plurality of content objects associated with the content item using at least two different communication protocols.

25. The system of claim 1, wherein determining a server-based rendering engine of a plurality of server-based rendering engines, separate from a user computing device of the user, that is rendering the content item comprises:
    causing the server-based rendering engine to initiate rendering the content item.

* * * * *